United States Patent [19]

Hildbrand et al.

[11] Patent Number: 4,904,892
[45] Date of Patent: Feb. 27, 1990

[54] SPINDLES FOR A SPINNING MACHINE WITH INDIVIDUAL DRIVES

[75] Inventors: Hans P. Hildbrand, Villmergen; David Fricker, Spreitenbach, both of Switzerland; Horst Wolf, Albershausen, Fed. Rep. of Germany

[73] Assignee: Zinser Textilmaschinen GmbH, Fed. Rep. of Germany

[21] Appl. No.: 257,055

[22] Filed: Oct. 13, 1988

[30] Foreign Application Priority Data

May 28, 1988 [DE] Fed. Rep. of Germany ....... 3818195

[51] Int. Cl.4 ............................................... H02K 5/04
[52] U.S. Cl. ..................................... 310/217; 310/90; 310/91
[58] Field of Search ...................... 57/100; 310/42, 43, 310/45, 91, 217, 218, 258, 90

[56] References Cited

U.S. PATENT DOCUMENTS

| | | | |
|---|---|---|---|
| 1,771,475 | 7/1930 | Wright | 310/42 |
| 3,202,851 | 8/1965 | Zimmerle et al. | 310/217 |
| 3,343,013 | 9/1967 | Wightman et al. | 310/258 |
| 4,476,407 | 10/1984 | Hildebrandt et al. | 310/42 |
| 4,801,831 | 1/1989 | Lewis | 310/258 |

FOREIGN PATENT DOCUMENTS

| | | | |
|---|---|---|---|
| 1037572 | 8/1958 | Fed. Rep. of Germany | 310/217 |
| 2154781 | 11/1971 | Fed. Rep. of Germany | . |
| 2950394 | 7/1981 | Fed. Rep. of Germany | 310/254 |

Primary Examiner—Patrick R. Salce
Assistant Examiner—D. L. Rebsch
Attorney, Agent, or Firm—Shefte, Pinckney & Sawyer

[57] ABSTRACT

A spindle for a ring spinning machine has an electric motor for rotating the spindle. The electric motor has a stator having a generally square configured stack of magnetically active plates. The corner regions of the stack of the stator have brackets mounted thereon which hold the plates together, and these brackets are fixedly mounted relative to the bearing housing of the spindle bank.

8 Claims, 2 Drawing Sheets

SPINDLES FOR A SPINNING MACHINE WITH INDIVIDUAL DRIVES

BACKGROUND OF THE INVENTION

The present invention relates to spindles on a spinning machine which are individually driven by separate drive motors. More particularly, the present invention relates to spindles on a spinning machine connected to rotors which are driven by corresponding stators fixedly mounted on the spindle bank of the spinning machine.

Spinning machines include spindles uniformly arranged along a spindle bank on which empty bobbins are placed for spinning yarn thereon. To increase the productivity of the spinning machines, while decreasing the energy consumption thereof and reducing the noise level during the operation of such machines, it is known to provide separate electric motors for each spindle to individually drive the spindles. The electric motors typically are of the conventional stator-rotor type in which a rotor is coaxially mounted to the spindle and is rotated due to the electromagnetic forces generated by the stator in which it is rotatably disposed.

It has been found to be particularly advantageous in the operation of ring spinning machines to operate the spindles at a high rate of rotation. However, such high rates of rotation can only be achieved if bobbins which are relatively small in relation to the bearings are used. Thus, to maximize the use of the space along the spindle bank of the spinning machine, it is preferable to use spindles of the smallest size possible, as well as components which are also of the smallest size possible.

SUMMARY OF THE INVENTION

The present invention advantageously provides an electric motor for driving a spindle having a stator composed of plates of generally square configuration, whereby the surface area of the plates is sufficient to generate the necessary power while the space requirements for the stator are minimized. specifically, the individual plates have relatively large magnetically active continuous ring surfaces, that is, surfaces of continuous annular configuration. Since the brackets of the stator of the present invention are positioned on the corners of the generally square plate stack, these brackets do not interfere with the continuous annular surface need for generating the electromagnetic forces. Additionally, since the corner regions of the generally square plates are the relatively least magnetically active portions of the plates, the location of the brackets in these regions does not significantly affect the operation of the stator. Accordingly, the present invention provides a stator having a relatively small extent in the direction along the spindle bank of the spinning machine, thereby facilitating the close placement of spindles along the spindle bank and increasing the productivity of the spinning machine.

The present invention provides a spindle drive apparatus for a spinning machine of the type having a spindle rotatably mounted in a bearing housing on the spindle bank of the spinning machine and on which spindle bobbins are disposed with a rotor fixedly mounted thereon for rotation therewith, the apparatus including a stator for rotating the rotor having a plurality of plates of generally square configuration arranged in stacked relation with their respective edges in alignment to form a plate stack of generally square configuration and a plurality of brackets for mounting the plate stack in fixed disposition relative to the bearing housing, with the brackets engaging the plate stack on the corner regions thereof. In one modification of the apparatus provided by the present invention, each plate corner region is formed with a projection increasing in width in the outward direction, the respective projections of the aligned corner regions of the plates forming a longitudinally extending projection and each of the brackets is formed with a compatibly configured recess for receiving one of the projections therein.

DETAILED DESCRIPTION OF THE PREFERRED EMBODIMENT

Figure 1:
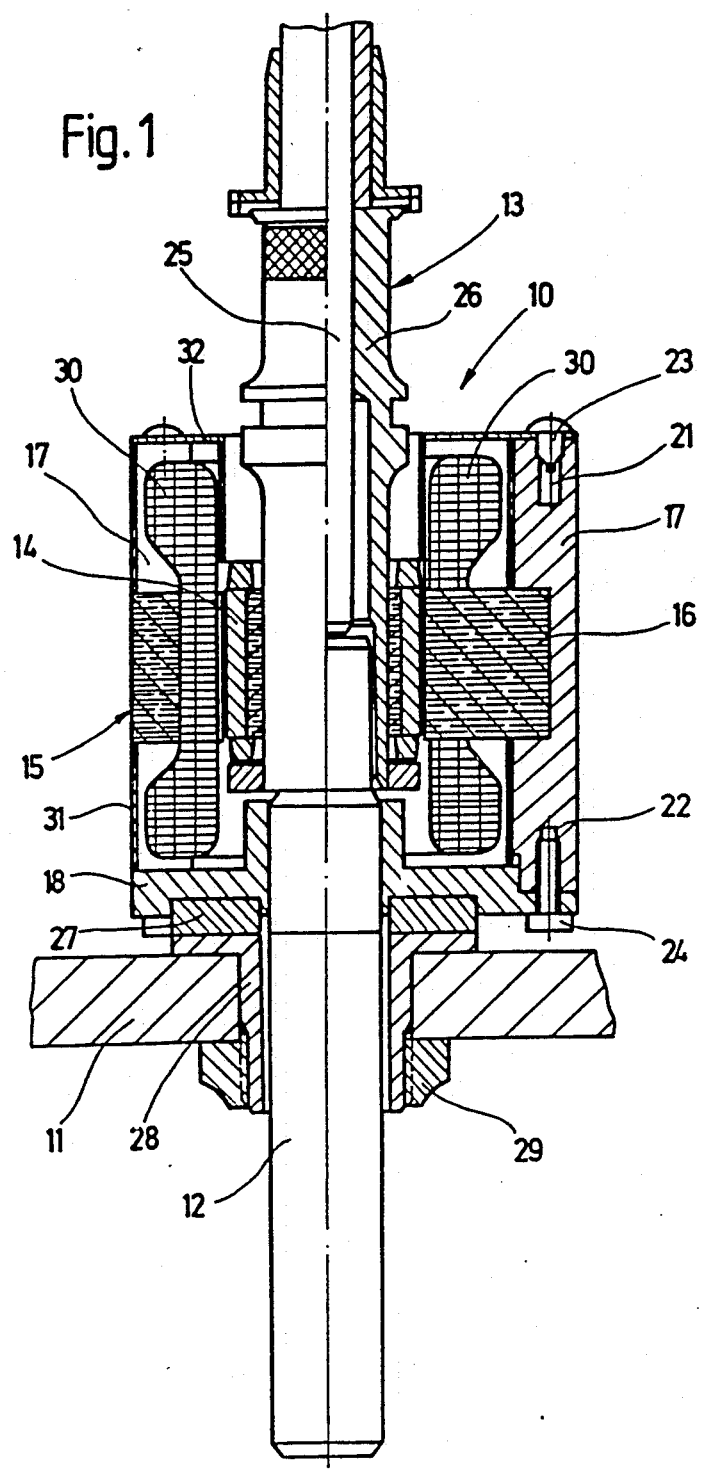
FIG. 1 is a front elevation, partially in section, of a spinning station of a spinning machine showing the stator of one preferred embodiment of the present invention in vertical section as viewed along line III–III of FIG. 2.

As shown in FIG. 1, a spinning station 10 of a spinning machine includes a spindle bank 11 having a bearing housing 12 mounted therein on which a spindle 13 is rotatably mounted. The spindle 13 includes an inner axial portion 25 rotatably mounted on the bearing housing 12 and a bell-like outer axial portion 26 which surrounds the inner axial portion 25. The outer axial portion 26 is adapted to receive an empty bobbin for rotating the bobbin to wind yarn thereon. The spinning station 10 also includes an electric motor having a stator 15 and a rotor 14 rotatably mounted within the stator. The rotor 14 is coaxial with and fixedly mounted to the outer portion 26 of the spindle 13.

The stator 15 is mounted on an interconnecting member 18 which is fixedly mounted by a collar to the bearing housing 12. Additionally, the interconnecting member 18 is mounted on an intermediate bearing 27 having a sleeve 28 connected thereto. The sleeve 28 projects through an opening in the spindle bank 11 of the spinning machine and is fastened to the spindle bank 11 by means of a nut 29 threaded onto the lower axial end of the sleeve.

The stator 15 includes a magnetic core 16 formed by a stack of magnetically active plates. Each plate has a plurality of circumferentially spaced, vertically extending, recesses aligned with the respective recesses of the other plates for receiving a plurality of electrically conductive coils 30 therein.

Figure 2:
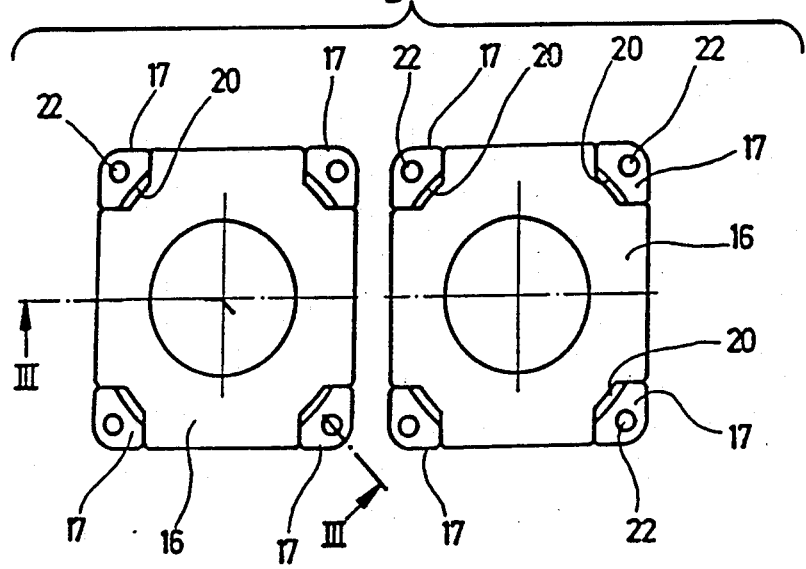
FIG. 2 is a bottom view of the stator shown in FIG. 1 and of another stator positioned adjacent thereto on the spindle bank of the spinning machine.

As best seen in FIG. 2, the magnetic core 16 is of generally square configuration and the magnetically active plates are of generally square configuration. Preferably, the plates are stamped out of a plurality of sheets placed in stacked relationship. By this type of stamping process, the plates of the magnetic core 16 can be stamped out of the plurality of sheets in a single operation and a plurality of crimpings, such as, for example, projections 16a, shown in FIG. 3, can be formed on each individual plate which project therefrom into the surface of a plate thereadjacent. The projections 16a enhance the capability of the individual plates of the magnetic core 16 to remain together so that the stack 16 can be easily handled and transported.

Figure 3:
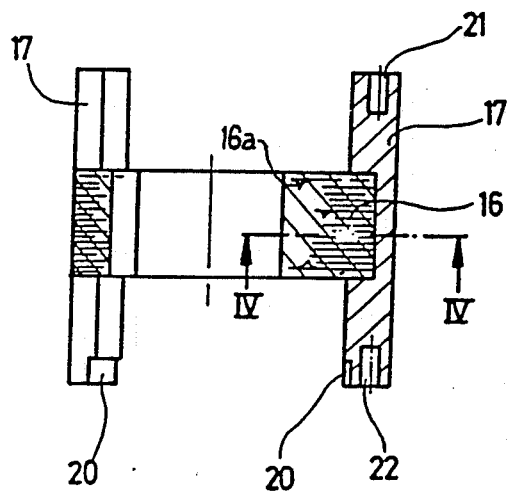
FIG. 3 is a vertical section taken along line III–III of FIG. 2 of the stator of FIG. 1, showing the plate stack and associated supporting brackets.

A plurality of brackets 17 are mounted each on a respective corner region of the magnetic core 16. Preferably, each bracket 17 is compatibly configured with the corner regions of the magnetic core 16 so that the assembly of the core 16 and the brackets 17 form a generally cubical configuration. Preferably, the brackets 17 are molded onto the magnetic core 16, which is supported on a spike during the molding process, and are molded out of diecast aluminum. Alternatively, the brackets 17 can be composed of fiber reinforced plastic, especially graphite fiber reinforced plastic. As shown in FIGS. 1-3, the brackets 17 are located only in the corner regions of the magnetic core 16 so that the other portions of the core are free of the brackets.

Figure 4:
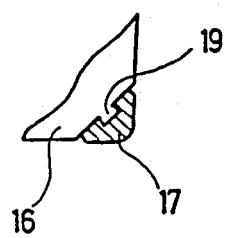
FIG. 4 is a partial horizontal section of the plate stack and one of the brackets taken along line IV–IV of FIG. 3.

As shown in FIGS. 3 and 4, each bracket 17 has an inner arcuate recess in its lower axial end 20. These curved inner recesses are adapted to cooperate with a cylindrical surface formed on the interconnecting member 18 to ensure that the stator 16 is centered with respect to the interconnecting member 18. Each axial end of each bracket 17 is provided with an axially extending bore 21 or 22, respectively. The bore 22 is threaded for threadably receiving a bolt 24 inserted through a corresponding bore in the interconnecting member 18. A cap 32 mounted to the top of the brackets 17 has a plurality of bores corresponding to the bores 21 through which a plurality of rivets 23 are inserted to interconnect the cap 32 and the brackets.

As seen in FIGS. 3 and 4, each bracket 17 is secured to the magnetic core 16 by means of a dovetail assembly 19 including a plurality of axially aligned laterally projecting portions formed on the plates of the magnetic core 16 and a compatibly configured axially extending recess on the bracket.

As seen in FIG. 2, the plates of the core 16 of the stators of adjacent spinning stations are arranged so that the outer side surface of the plates are parallel and aligned with one another. The magnetic core 16 provides a continuous annular ring surface for the travel of magnetic forces (which have a magnitude in the range of the distance between the components of two adjacent magnetic cores 16, that is, the distance between the adjacent magnetic cores less a security distance.) The continuous annular ring surface, which is enlarged by the additional surface area provided by the corners of the plates of the magnetic cores 16, is designed to provide sufficient magnetic flow with smallest possible diameter necessary to operate the spinning operation. Although the preferred embodiment has been described with respect to a generally square magnetic core 16, the invention comprehends the use of magnetic cores of other configurations which also offer continuous annular surface area for magnetic flow.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A spindle drive apparatus for a spinning machine of the type having a bobbin supporting spindle rotatably supported on a spindle bank of the spinning machine, comprising:
   a rotor fixedly coaxially mounted to the spindle;
   a stator for rotating said rotor to thereby rotate the spindle, said stator having a plurality of plates of generally square configuration arranged in stacked relation with their respective edges in alignment to form a plate stack of generally square configuration;
   means, extending in only one axial direction with respect to said stator, for rotatably supporting the spindle within said stator for driving rotation of the spindle by the cooperative operation of said stator and said rotor, said spindle supporting means including a bearing housing mounted to the spindle bank and extending into said stator; and
   means for supporting said stator solely from one axial end thereof in a fixed disposition relative to the spindle bank and said bearing housing, said stator supporting means including an interconnecting member fixedly mounted to said bearing housing and a plurality of brackets for fixedly mounting said plate stack to said interconnecting member, said brackets engaging said plate stack in the corner regions thereof.

2. A spindle drive apparatus according to claim 1 and characterized further in that the side portions of the plate stack between the brackets are uncovered.

3. A spindle drive apparatus according to claim 1 and characterized further in that the brackets are molded onto the plate stack.

4. A spindle drive apparatus according to claim 1 and characterized further in that each corner region is formed with a projection increasing in width in the outward direction, the respective projections of the aligned corner regions of the plates forming a longitudinally extending projection, and each of the brackets being formed with a compatibly configured recess for receiving one of the projections therein.

5. A spindle drive apparatus according to claim 3 and characterized further in that each plate corner region is formed with a projection increasing in width in the outward direction, the respective projections of the aligned corner regions of the plates forming a longitudinally extending projection, and each of the brackets being formed with a compatibly configured recess for receiving one of the projections therein.

6. A spindle drive apparatus according to claim 1 and characterized further in that said plates include interengaging edge crimpings that interconnect said plates in stacked relation.

7. A spindle drive apparatus according to claim 1 and characterized further in that said interconnecting member includes a cylindrical surface and one end of each bracket is formed of an inner arcuate recess for cooperating with said cylindrical surface of said interconnecting member.

8. A spindle drive apparatus according to claim 1 and characterized further by means for fastening said brackets and said interconnecting member together including an axial bore in one end of each of said brackets, a plurality of bores in said interconnecting member and means disposed in respective aligned bores of sad brackets and said interconnecting member.

* * * * *